(12) United States Patent
Shimada et al.

(10) Patent No.: US 6,902,328 B2
(45) Date of Patent: Jun. 7, 2005

(54) OPTICAL MODULE AND MANUFACTURING METHOD THEREOF

(75) Inventors: Mikihiro Shimada, Kadoma (JP); Masanori Iida, Katano (JP); Hiroyuki Asakura, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 155 days.

(21) Appl. No.: 10/208,069

(22) Filed: Jul. 29, 2002

(65) Prior Publication Data

US 2003/0035634 A1 Feb. 20, 2003

(30) Foreign Application Priority Data

Jul. 30, 2001 (JP) ........................................ 2001-230448

(51) Int. Cl.[7] .............................. G02B 6/30; G02B 6/36
(52) U.S. Cl. .............................. 385/88; 385/49; 385/92
(58) Field of Search ............................. 385/49, 88, 92

(56) References Cited

U.S. PATENT DOCUMENTS

| | | | | | |
|---|---|---|---|---|---|
| 5,136,678 | A | * | 8/1992 | Yoshimura | ................... 385/132 |
| 6,403,948 | B1 | * | 6/2002 | Tachigori | ................ 250/227.11 |
| 6,477,302 | B2 | * | 11/2002 | Tatoh | ........................... 385/49 |
| 6,534,725 | B2 | * | 3/2003 | Tsukahara | ................... 174/260 |
| 2003/0007754 | A1 | * | 1/2003 | Terashima | .................... 385/92 |

FOREIGN PATENT DOCUMENTS

JP            3228229           9/2001

* cited by examiner

Primary Examiner—John D. Lee
Assistant Examiner—Tina M Lin
(74) Attorney, Agent, or Firm—RatnerPrestia

(57) ABSTRACT

An optical module has
  a high-frequency circuit substrate;
  at least one optical semiconductor device mounted on the high-frequency circuit substrate; and
  an optical waveguide substrate arranged on the high-frequency circuit substrate.

15 Claims, 8 Drawing Sheets

OPTICAL MODULE AND MANUFACTURING METHOD THEREOF

BACKGROUND OF THE INVENTION

1. Field of the Invention

The present invention relates to an optical module mainly used in the optical communication, and a manufacturing method of an optical module, and a communication apparatus.

2. Description of the Related Art

Recently, in the public communications, computer networks, and the like, there are prevailing such optical communication systems that utilize broad band optical communication, and in addition have the functions of wavelength multiplexing transmission and two-way transmission, for the purpose of speeding up and function upgrading.

In the field of optical communication, in order to perform high-level optical signal processing, research works are being performed eagerly for developing optical integrated circuits having various functions. An optical integrated circuit has an optical waveguide as its main component. An optical waveguide is a device in which a core region having a high refractive index is covered with a clad layer having a relatively lower refractive index, thereby confining the light in the core region to be transmitted. A variety of functions of an optical waveguide are provided by arranging variously patterned cores. In particular, optical waveguides based on quartz have a number of merits such as low loss, physical and chemical stabilities, matching with optical fibers, and the like, which makes quartz optical waveguides the representative ones.

Technologies in which an active optical element is mounted on an optical waveguide, there by miniaturizing, providing with multifunction, and bringing down costs, are regarded as promising, and accordingly are investigated at full blast. In these modules, for the purpose of integration, optical semiconductor devices such as a semiconductor laser, a photodiode, and the like are mounted, on an optical waveguide platform in which a quartz-based optical waveguide is formed on a silicon substrate.

SUMMARY OF THE INVENTION

In these above described optical modules, however, there have been the following problems regarding costs and performances.

As shown in FIG. 5, a conventional optical module has a structure in which a substrate 51 having an optical waveguide formed thereon and a high-frequency circuit substrate 52 are independently and separately arranged, so that it is not suitable for integration. In addition, since an optical semiconductor 53 and a signal line in the high frequency circuit substrate 52 are arranged away from each other, when electrically connecting the optical semiconductor 53 arranged on an optical waveguide platform with the high-frequency circuit substrate 52, it is necessary to use a wire to connect conductively the optical semiconductor 53 and the signal line, thereby generating a stray capacity, and as a result of its operation, a problem occurs in that noises are added to the electric signal. In addition, deteriorations in the high-frequency characteristic and the like occur, in such a way that with increasing speed of transmission, the number and kind of problems increase.

In addition, wire-bonding wiring is necessary for wiring between electrodes. Wire bonding, however, is more troublesome than patterning wiring, and is not suitable for such a wiring architecture that requires highly integrated, complicated, and high-density circuits.

Furthermore, when an optical semiconductor mounted on a quartz-based optical waveguide is operated, it has been needed to take a measure for heat liberation in which an optical waveguide is formed on a Si substrate 59 processed beforehand, and then an optical semiconductor 53 is mounted.

As described above, conventional optical modules are far from those optical modules which can be expected to be simultaneously excellent in performance and low in costs. In other words, it is a significant subject to develop and provide such high quality optical modules.

In view of the subject motivated by improvement of conventional optical modules, an object of the present invention is to provide an optical module which is at the same time high in performance and low in cost, a manufacturing method thereof, and a communication apparatus using thereof.

One aspect of the present invention is an optical module comprising:

a high-frequency circuit substrate;

at least one optical semiconductor device mounted on said high-frequency circuit substrate; and an optical waveguide substrate arranged on said high-frequency circuit substrate.

Another aspect of the present invention is the optical module wherein said optical waveguide substrate has a first substrate having a groove for optical waveguide, and said groove for optical waveguide is filled with a material of high refractive index.

Still another aspect of the present invention is the optical module wherein said optical waveguide substrate is formed by bonding said first substrate and a second substrate with a material of high refractive index having a refractive index higher than those of said first substrate and said second substrate.

Yet still another aspect of the present invention is the optical module wherein the side surface of said first substrate, which surface having said groove for optical waveguide, is bonded to said high-frequency circuit substrate with said material of high refractive index.

Still yet another aspect of the present invention is the optical module wherein the side surface of said first substrate, which surface having said groove for optical waveguide, is bonded to said high-frequency circuit substrate with a material of low refractive index having a refractive index lower than that of said material of high refractive index.

A further aspect of the present invention is the optical module wherein the side surface of said second substrate, which surface is reverse to the side surface bonded to said first substrate, is bonded to said high-frequency circuit substrate with a resin material.

A still further aspect of the present invention is the optical module wherein said optical waveguide substrate and said high-frequency circuit substrate have markers for positioning.

A yet further aspect of the present invention is the optical module wherein said material of high refractive index is a glass-based material or a resin.

A still yet further aspect of the present invention is the optical module wherein a glass-based material or a resin is used for said optical waveguide substrate.

An additional aspect of the present invention is the optical module wherein said high-frequency circuit substrate has on one of its end faces an arrangement groove for optical fiber or an optical element.

A still additional aspect of the present invention is the optical module wherein said optical waveguide substrate has an arrangement groove for said optical fiber or said optical element.

A yet additional aspect of the present invention is the optical module wherein the relief shapes of said groove for optical waveguide, said marker for positioning, and said arrangement groove for optical fiber are formed en bloc by use of a mold having a patterned indented surface.

A still yet additional aspect of the present invention is the optical module wherein said high-frequency circuit substrate is a microstrip line substrate or a coplanar line substrate.

A supplementary aspect of the present invention is the optical module wherein said high-frequency circuit substrate and said optical waveguide substrate are arranged with a resin matter interposing therebetween.

A still supplementary aspect of the present invention is the optical module in which said high-frequency circuit substrate is composed of a substrate having a groove for optical waveguide and a material higher in refractive index than said substrate having a groove for optical waveguide, wherein:

said groove for optical waveguide is filled with said material of high refractive index.

A yet supplementary aspect of the present invention is the optical module wherein said high-frequency circuit substrate is arranged on a metallic base.

A still yet supplementary aspect of the present invention is the optical module wherein an arrangement groove for optical fiber is formed on said metallic base.

Another aspect of the present invention is a manufacturing method of an optical module with which the optical module is manufactured comprising:

mounting at least one optical semiconductor device on said high-frequency circuit substrate; and arranging said optical waveguide substrate on said high-frequency circuit substrate.

Still another aspect of the present invention is a manufacturing method of an optical module with which the optical module is manufactured, comprising: coating the side surface of said first substrate, which surface having said groove for optical waveguide, with said material of high refractive index, and bonding the side surface to said high-frequency circuit substrate.

A further aspect of the present invention is a manufacturing method of an optical module with which the optical module is manufactured, comprising:

filling said groove for optical waveguide of said first substrate with said material of high refractive index; and coating the side surface of said first substrate, which surface having said groove for optical waveguide, with a material of low refractive index, lower in refractive index than said material of high refractive index, and bonding it to said high-frequency circuit substrate.

A still further aspect of the present invention is a manufacturing method of an optical module with which the optical module is manufactured, comprising:

bonding said first substrate and second substrate to each other with said material of high refractive index; and bonding the side surface of said second substrate, which surface is reverse to the side surface bonded to said first substrate, to said high-frequency circuit substrate with a resin material.

A yet further aspect of the present invention is a manufacturing method of an optical module with which the optical module is manufactured, comprising:

using a photocuring resin as said material of high refractive index; and irradiating said photocuring resin with light to be cured to manufacture said optical module.

A still yet further aspect of the present invention is a manufacturing method of an optical module with which the optical module is manufactured, wherein said optical waveguide subst6rate and said high-frequency circuit substrate are positioned through the intermediary of said optical fiber when said optical waveguide substrate is arranged on said high-frequency circuit substrate.

A still yet further aspect of the present invention is a communication apparatus with which optical communication is performed via an optical fiber with another communication apparatus, comprising:

a transmission device in which an incoming electric signal is converted into a optical signal to be transmitted; and a receiving device in which an optical signal transmitted by said another communication apparatus is converted into an electric signal to be output; wherein the optical module is used for said transmission device and/or said receiving device.

DESCRIPTION OF SYMBOLS

Figure 1:
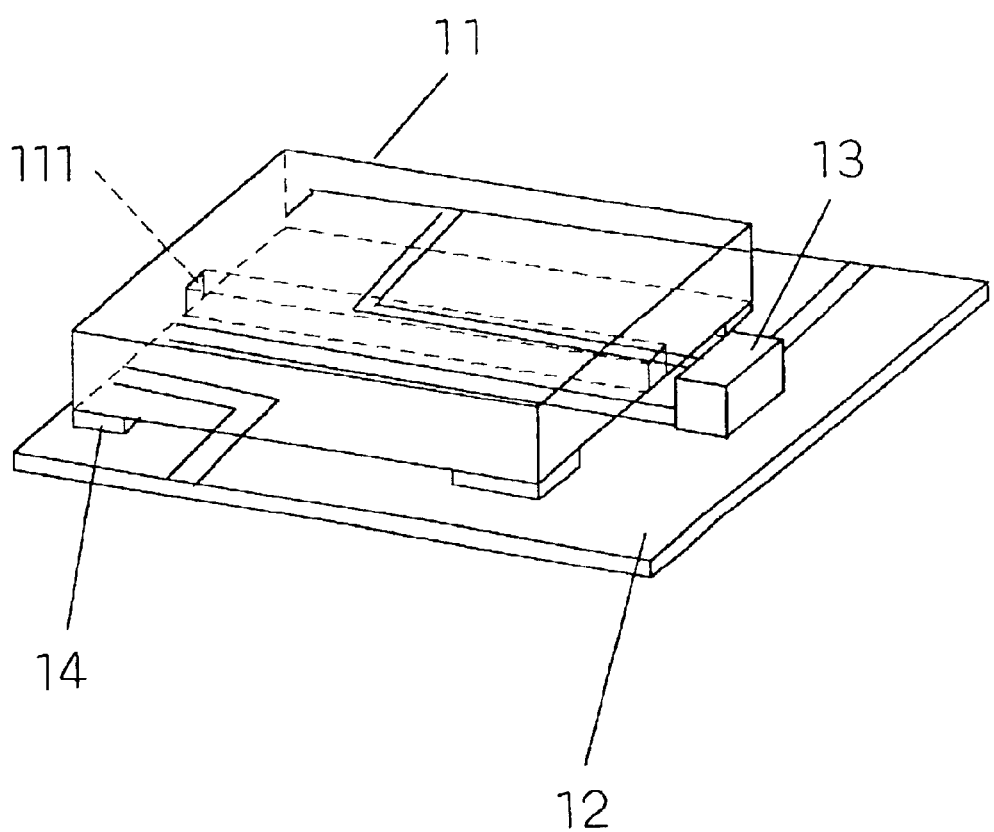
FIG. 1 shows an optical module of Embodiment 1 of the present invention.

11, 21, 31, 41, 51: Optical waveguide substrate
12, 22, 32, 42, 52: High-frequency circuit substrate
13, 23, 33, 43, 53: Optical semiconductor device
14, 24: Spacer
25, 35, 45: Guide groove for optical fiber
26, 36, 46: Optical fiber
37: Cut-off portion for optical fiber
47: Arrangement groove for optical fiber
48: Metallic base
59: Si substrate

DETAILED DESCRIPTION OF THE PREFERRED EMBODIMENTS

With reference to the drawings, embodiments of the present invention will be explained below. In what follows, those potions having the same reference numerals denote the same portions.

(Embodiment 1)

At first, description will be made on Embodiment 1 of the present invention for an optical module and a manufacturing method thereof.

FIG. 1 shows an optical module of Embodiment 1 of the present invention.

As FIG. 1 shows, at the beginning, a groove 111 for optical waveguide and a marker (not shown) for positioning to a high-frequency circuit substrate 12 are formed by use of a mold (not shown) on a substrate 11 made of a glass or a transparent resin.

Then, an ultraviolet curing resin is applied as a material of high refractive index onto the surface where the groove 111 for optical waveguide is formed, and the groove 111 for optical waveguide is filled with the ultraviolet curing resin. Subsequently, the ultraviolet curing resin in the groove 111 for optical waveguide is cured by ultraviolet light irradiation. By using a resin higher in refractive index than the substrate as an ultraviolet curing resin, the ultraviolet curing resin in the groove 111 for optical waveguide functions as a core for the waveguide. Thus, the formation of a waveguide substrate 11 is completed. In the optical waveguide substrate 11, there is no clad substrate bonded to the substrate on which the groove 111 for optical waveguide is formed. Since the light is confined in the region relatively higher in refractive index, a layer of air serves as an upper clad for the optical waveguide 11.

Then, an optical semiconductor device 13 is mounted on a surface of a high-frequency circuit substrate 12. The patterns of a desired microstrip line and electrodes, and the markers (not shown) for placing the optical semiconductor device 13 and the optical waveguide substrate 11 are beforehand arranged on the high-frequency circuit substrate 12. Placing the optical semiconductor device 13 via this marker permits an easy positioning of it. The high-frequency circuit substrate 12 and the optical semiconductor device 13 are electrically connected. The high-frequency circuit substrate 12 maybe made of, for example, a ceramic substrate, a Teflon substrate, an FR4 substrate, or the like.

The optical module as shown in FIG. 1 is completely formed in such a way that the optical waveguide substrate 11 is arranged on the high-frequency circuit substrate 12 with the optical semiconductor device 13 mounted thereon, by making positioning on the basis of the markers and adjusting the height of the substrate 11 with a spacer.

As for the groove 111 for optical waveguide, it is preferably formed by molding from the manufacturing point of view, as described in the present embodiment, but its formation method is not limited to molding, and it may also be formed by etching according to need. In the present embodiment, the groove 111 for optical waveguide is filled with a ultraviolet curing resin, but the filling material is not limited to it, and such resins as polyamide and the like may be used. As for the clad layer, it may be formed by bonding another glass substrate. Spin coating may also be applied to formation of the clad.

In the present Embodiment, the optical waveguide substrate 11 is fabricated by forming the groove 111 for optical waveguide, but the fabricating procedure thereof is not limited to this, and the optical waveguide may be constructed by depositing the core and clad onto the surface of the optical waveguide substrate 11.

Although as for the present Embodiment, one straight-line type waveguide is illustrated, the present Embodiment is not restrictred to this type, but it is also applicable to all the waveguide patterns generally used, and in particular it can control the bending, branching, and integrating of the lightwaves.

Although as for the present Embodiment, description is made on a case where an optical semiconductor device 13 is mounted, the number of the optical semiconductors mounted is not limited to one, and a plurality of optical semiconductors may be mounted, and furthermore, a laser diode, a photodiode, and the like may be included to be used in combination thereof.

Although as for the present Embodiment, description is made on a high-frequency substrate 12 where a microstrip line is arranged, the line is not restricted this type, but a coplanar line may also be used.

In addition, a high-frequency circuit substrate 12 is preferably made of a material which has a thermal expansion coefficient close to that of an optical waveguide substrate 11.

As described above, according to an optical module of the present Embodiment, the integration of an optical module can be promoted by arranging an optical waveguide substrate 11 on a high-frequency circuit substrate 12, and mounting an optical semiconductor device 13 on the high-frequency circuit substrate 12. In this case, direct mounting of an optical semiconductor 13 on a high-frequency circuit substrate 12 makes it possible to shorten the signal line between the optical semiconductor 13 and the high-frequency circuit substrate 12, which makes it possible to suppress, to the lowest possible level, an inconvenience that the stray capacity caused by the signal line generates noises superposing on the electric signal.

Figure 4:
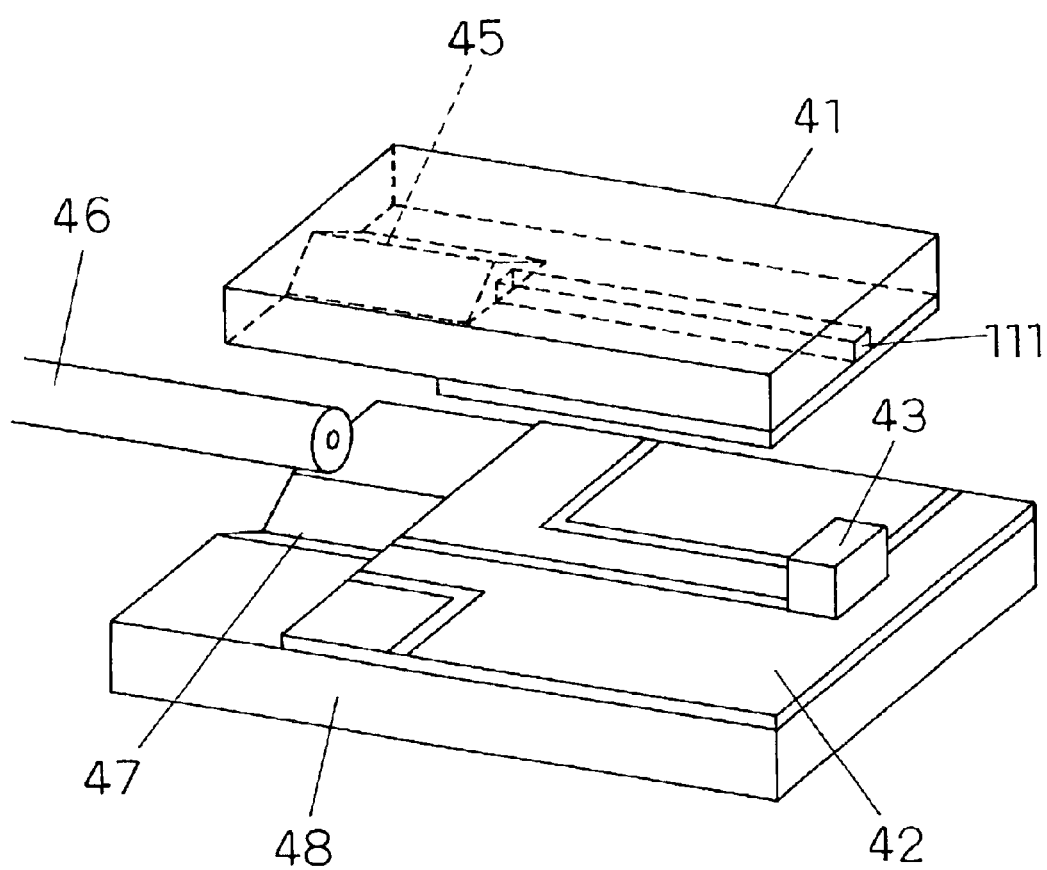
FIG. 4 shows an optical module of Embodiment 4 of the present invention.
Figure 5:
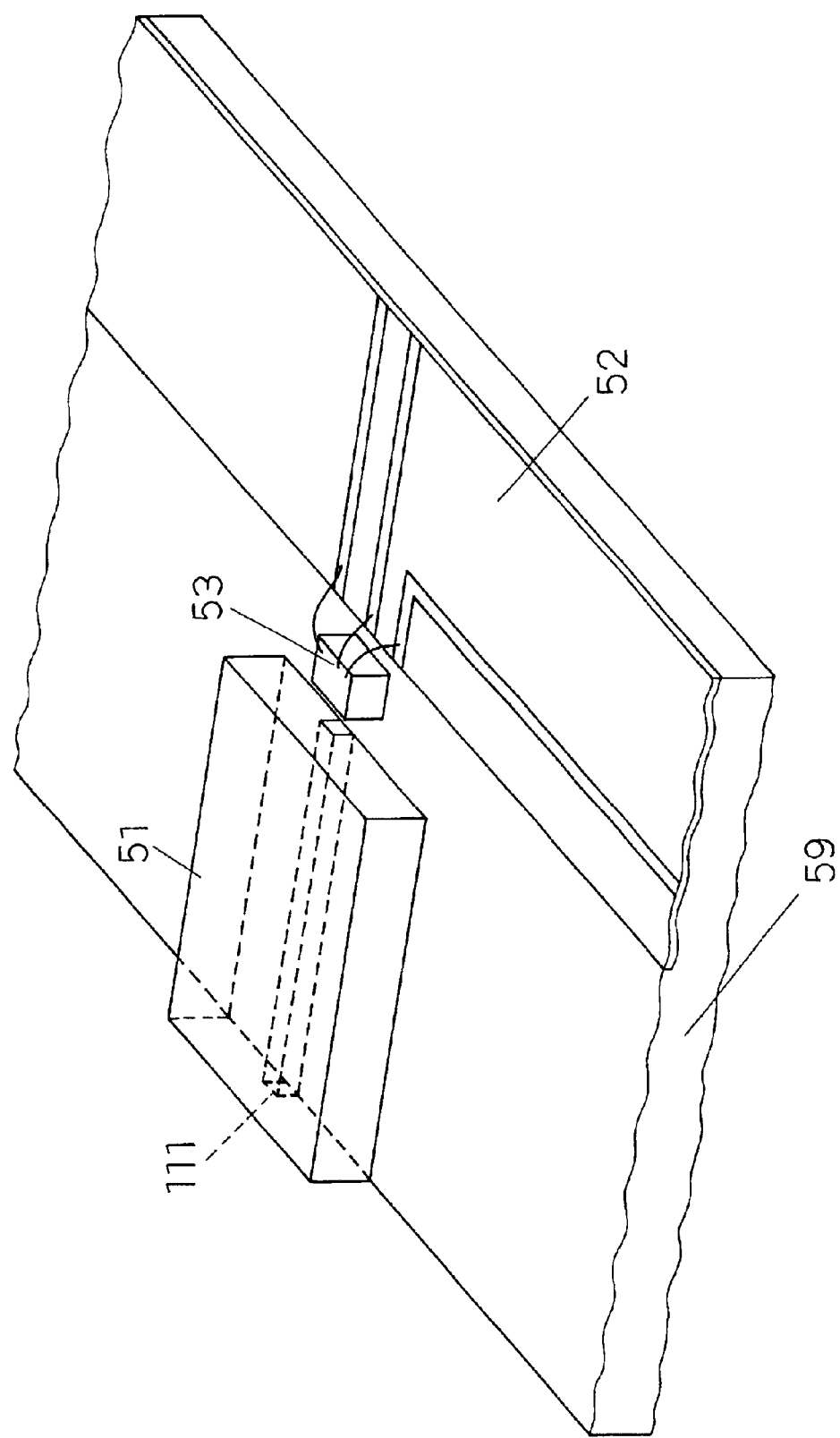
FIG. 5 shows a conventional optical module.

In addition, according to an optical module of the present Embodiment, since an optical waveguide substrate 11 is arranged on a high-frequency circuit substrate 12, and an optical semiconductor device 13 is mounted on the high-frequency circuit substrate 12, heat liberation can be made easily by way of a metallic pattern formed on a high-frequency circuit substrate 12 which is made of a high thermal conductivity material having as main components aluminum nitride (AlN), silicon carbide (SiC), and the like, and by way of a through hole arranged in the high-frequency circuit substrate 12 and filled with a heat-liberating material. In other words, since the high-frequency circuit substrate 12 is formed on such a metallic base 48 as shown in FIG. 4 to be explained later, and such a through hole is connected to the metallic base 48, the heat can be easily liberated to the metallic base 48.

(Embodiment 2)

Now, description will be made on Embodiment 2 of the present invention for an optical module and a manufacturing method thereof.

Figure 2:
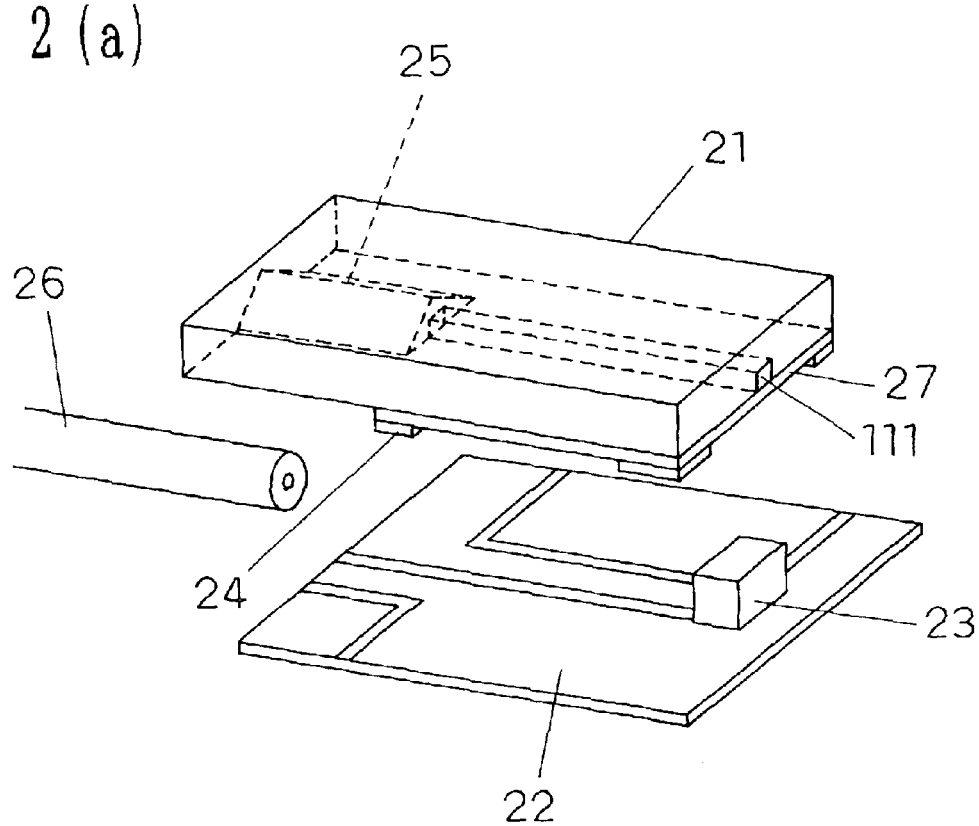
FIG. 2 shows (a) an optical module of Embodiment 2 of the present invention, and (b) a side view thereof.
Figure 2:
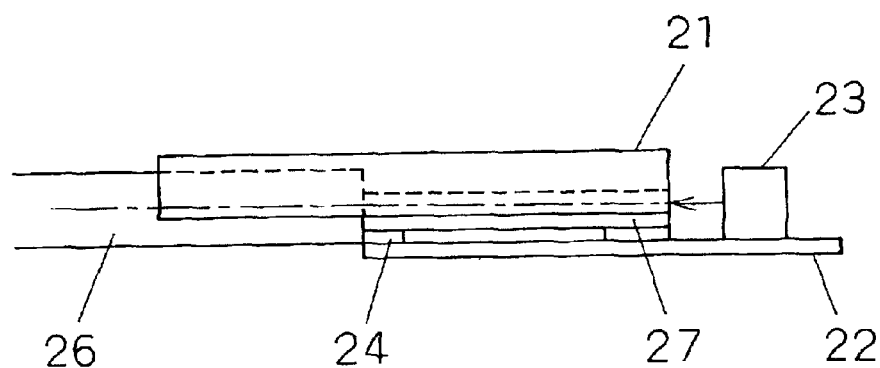

FIG. 2(*a*) shows an optical module of Embodiment 2, and FIG. 2(*b*) shows a side view thereof.

At the beginning, as FIG. 2 shows, a groove 11 for optical waveguide, a guide groove 25 for optical fiber, and a marker (not shown) for image-recognition positioning to a high-frequency circuit substrate 22 are formed by use of a mold (not shown) on the surface of a substrate 21 made of a glass or a transparent resin.

Then, an ultraviolet curing resin is applied as a material of high refractive index onto the surface where the groove 111 for optical waveguide is formed, and the groove 111 for optical waveguide is filled with the ultraviolet curing resin. Subsequently, a clad substrate 27 is bonded to the optical waveguide substrate 21. The ultraviolet curing resin in the groove 111 for optical waveguide is cured by ultraviolet light irradiation. By using a resin higher in refractive index than the optical waveguide substrate 21 and the clad substrate 27 as an ultraviolet curing resin, the ultraviolet curing resin in the groove 111 for optical waveguide functions as a core for the waveguide. Thus, the formation of a waveguide substrate 21 is completed. The clad substrate 27 in this case is an example of a second substrate of the present invention.

An optical fiber 26 is arranged in the guide groove 25 for optical fiber, and fixed with an ultraviolet curing resin. Thus, the optical waveguide and the optical fiber 26 are arranged with a high precision.

Then, an optical semiconductor device 23 is mounted on the surface of the high-frequency circuit substrate 22. The patterns of a desired microstrip line and electrodes, and the markers (not shown) for placing the optical semiconductor device 23 and the optical waveguide substrate 21 are arranged beforehand on the high-frequency circuit substrate 22. Placing the optical semiconductor device 23 via this marker on the high-frequency circuit substrate 22 permits an easy positioning of it. The high-frequency circuit substrate 22 and the optical semiconductor device 23 are electrically connected.

The optical module as shown in FIG. 2 is completely formed in such a way that the optical waveguide substrate 21 is finally arranged on the high-frequency circuit substrate 22 with the optical semiconductor device 23 mounted thereon, by making positioning on the basis of the markers and adjusting the height of the substrate 21 with a spacer.

As for the groove 111 for optical waveguide, it is preferably formed by molding from the manufacturing point of view, as described in the present embodiment, but its formation method is not limited to molding, and it may also be formed by etching according to need. In the present embodiment, the groove 111 for optical waveguide is filled with an ultraviolet curing resin, but the filling material is not limited to it, and such resins as polyamide and the like may be used. As for the clad layer, it may be formed by spin coating.

In the present Embodiment, the optical waveguide is fabricated by forming the groove for it, but the fabricating procedure thereof is not limited to this, and it may be constructed by depositing the core and clad onto the substrate surface.

Although as for the present Embodiment, one straight-line type waveguide is illustrated, the present Embodiment is not restrictred to this type, but it is also applicable to all the waveguide patterns generally used, and in particular it can control the bending, branching, and integrating of the lightwaves.

Although as for the present Embodiment, description is made on a case where an optical semiconductor device is mounted, the number of the optical semiconductors mounted is not limited to one, a plurality of optical semiconductors may be mounted, and furthermore, a laser diode, a photodiode, and the like may be included to be used in combination thereof.

Although as for the present Embodiment, description is made on a high-frequency substrate 12 where a microstrip line is arranged, the line is not restricted this type, but a coplanar line may also be used.

(Embodiment 3)

Now, description will be made on Embodiment 3 of the present invention for an optical module and a manufacturing method thereof.

Figure 3:
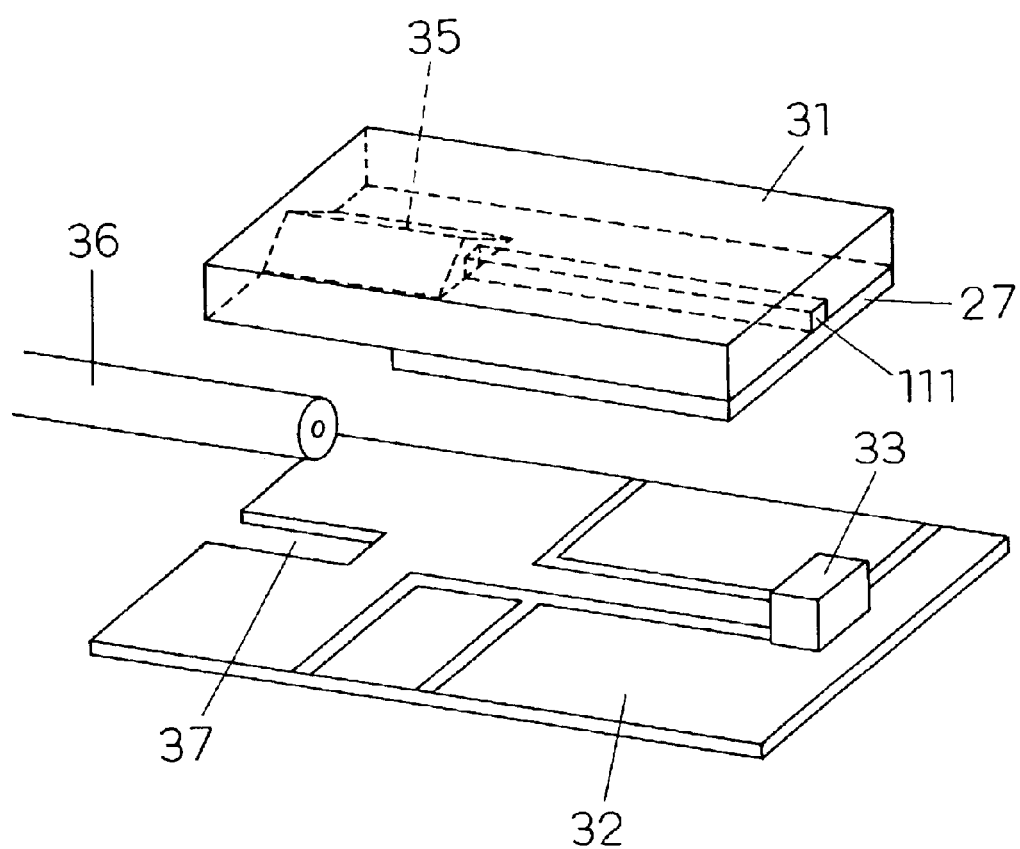
FIG. 3 shows an optical module of Embodiment 3 of the present invention.

At the beginning, as FIG. 3 shows, a guide groove 35 for optical fiber and a groove 111 for optical wavegudie are formed by use of a mold (not shown) on the surface of a substrate 31 made of a glass or a transparent resin.

Then, an ultraviolet curing resin is applied as a material of high refractive index onto the surface where the groove 111 for optical waveguide is formed, and the groove 111 for optical waveguide is filled with the ultraviolet curing resin.

Subsequently, a clad substrate 27 is bonded to the optical waveguide substrate. The ultraviolet curing resin in the groove 111 for optical waveguide is cured by ultraviolet light irradiation. By using a resin higher in refractive index than the optical waveguide substrate 31 and the clad substrate 27 as an ultraviolet curing resin, the ultraviolet curing resin in the groove 111 for optical waveguide functions as a core for the waveguide. Thus, the formation of a waveguide substrate 31 is completed.

An optical fiber 36 is arranged in a guide groove 35 for optical fiber, and fixed with a photocuring resin. Thus, the optical waveguide and an optical fiber 36 are arranged with a high precision.

Then, an optical semiconductor device 33 is mounted on the surface of the high-frequency circuit substrate 32. The patterns of a desired microstrip line and electrodes, and the marker for placing an optical semiconductor device 33 are arranged beforehand on the high-frequency circuit substrate 32. Then, a cut-off portion 37 for an optical fiber to be used in arranging thereof is formed in an end face of the high-frequency circuit substrate 32. A spacer used in optical axis alignment is made unnecessary by the formation of the cut-off portion 37 for an optical fiber, which will be described later.

Placing the optical semiconductor device 33 via the marker on the high-frequency circuit substrate 32 facilitates the positioning. The high-frequency circuit substrate 32 and the optical semiconducor device 33 are electrically connected.

The optical waveguide substrate 31 is finally arranged, by interposing an optical fiber 36, on the cut-off portion 37 for an optical fiber formed on the high-frequency circuit substrate 32, resulting in completion of an optical module as shown in FIG. 3. In this way, the position between the optical semiconductor device 33 and the optical waveguide becomes easier. The adjustment along the direction of height can also be made by use of the optical fiber.

In other words, by use of the cut-off portion 37 for an optical fiber, the optical axis of an optical semiconductor device 33 and that of an optical fiber 36 can be aligned properly. In addition, the V-groove shape of a guide groove 35 for optical fiber facilitates the alignment of the optical axis of an optical fiber 36 and that of an optical waveguide. When the guide groove 35 for optical fiber strikes against the optical fiber 36, the surface of the optical waveguide substrate 31 facing to the high-frequency circuit substrate 32 is not in contact therewith. That is to say, when there is left a space between the optical waveguide substrate 31 and the high-frequency circuit substrate 32, a proper amount of a resin sufficient to fill the space may be applied onto the surface of the optical waveguide substrate 31 facing to the high-frequency circuit substrate 32.

In this way, without using a spacer for optical axis alignment, the optical axis alignment between the optical semiconductor device 33 and the optical fiber 36, and that between the optical waveguide and the optical fiber 36 can be easily carried out.

As for the groove 111 for optical waveguide, it is preferably formed by molding, as described for the present Embodiment, from the manufacturing point of view, but its formation method is not limited to molding, and it may be formed by etching according to need. In the present Embodiment, the groove 111 for optical waveguide is filled with a ultraviolet curing resin, but the filling material is not limited to it, and such resins as polyamide and the like may be used. As for the clad layer, it may be formed by spin coating, and it may also be formed by using another ultraviolet curing resin, with which clad layer the optical waveguide substrate and the high-frequency circuit substrate may be joined fixedly.

In the present Embodiment, the optical waveguide substrate is fabricated by forming the groove 111 for optical waveguide, but the fabrication procedure thereof is not limited to this, and the optical waveguide may be constructed by depositing the core and clad onto the substrate surface.

Although as for the present Embodiment, one straight-line type waveguide is illustrated, the present Embodiment is not restricted to this type, but it is also applicable to all the waveguide patterns generally used, and in particular it can control the bending, branching, and integrating of the lightwaves.

Although as for the present Embodiment, description is made on a case where an optical semiconductor device is mounted, the number of the optical semiconductors mounted is not limited to one, and a plurality of optical semiconductors may be mounted, and furthermore, a laser diode, a photodiode, and the like may be included to be used in combination thereof.

Although as for the present Embodiment, description is made on a high-frequency circuit substrate where a microstrip line is arranged, the line is not restricted to this type, but a coplanar line may be used.

(Embodiment 4)

Now, description will be made on Embodiment 4 of the present invention for an optical module and a manufacturing method thereof.

At the beginning, as FIG. 4 shows, a groove 111 for optical waveguide, a guide groove 45 for optical fiber, and a marker for image-recognition positioning to a high-frequency circuit substrate 42 are formed by use of a mold (not shown) on the surface of a substrate 41 made of a glass or a transparent resin.

Then, an ultraviolet curing resin is applied as a material of high refractive index onto the surface where the groove 111 for optical waveguide is formed, and the groove 111 for optical waveguide is filled with the ultraviolet curing resin. Subsequently, a clad substrate is bonded to the optical waveguide substrate. The ultraviolet curing resin in the groove 111 for optical waveguide is cured by ultraviolet light irradiation. By using a resin higher in refractive index than the substrate and clad substrate as an ultraviolet curing resin, the ultraviolet curing resin in the groove 111 for optical waveguide functions as a core for the waveguide. Thus, the formation of a waveguide substrate 41 is completed.

An optical fiber 46 is arranged in the guide groove 45 for optical fiber, and fixed with an ultraviolet resin. Thus, the optical wave guide and the optical fiber 46 are arranged with a high precision.

Then, an optical semiconductor device 43 is mounted on the surface of the high-frequency circuit substrate 42. The patterns of a desired microstrip line and electrodes, and the markers for placing the optical semiconductor device 43 and the optical waveguide substrate 41 are arranged beforehand on the high-frequency circuit substrate 42. Placing the optical semiconductor device 43 via this marker on the high-frequency circuit substrate 42 permits an easy positioning of it. The high-frequency circuit substrate 42 and the optical semiconductor device 43 are electrically connected.

Then, the high-frequency circuit substrate 42 with an optical semiconductor device 43 mounted thereon is arranged on the metallic base 48 on which an arrangement groove 47 for optical fiber is formed. The optical waveguide substrate 41 is arranged, by interposing the optical fiber 46, to the arrangement groove 47 for optical fiber on the metallic base 48. Thus, the optical waveguide substrate 41 can be adjusted in height relatively to the optical semiconductor device 43. That is to say, the V-grove shape of the arrangement groove 47 for optical fiber facilitates the alignment of the optical axis of the optical semiconductor device 43 and that of the optical fiber 46. The V-groove shape of the guide groove 45 for optical fiber also facilitates the alignment of the optical axis of the optical fiber 46 and that of the optical waveguide. In this way, without using a spacer for optical axis alignment, the optical axis alignment between the optical semiconductor device 43 and the optical fiber 46, and that between the optical waveguide and the optical fiber 46 can be easily carried out.

In addition, the metallic base 48 can make the optical semiconductor 43 to be able to liberate the heat efficiently.

When there is left a space between the optical waveguide substrate 41 and the high-frequency circuit substrate 42, a proper amount of a resin sufficient to fill the space may be applied onto the surface of the optical waveguide substrate 41 facing to the high-frequency circuit substrate 42.

The high-frequency circuit substrate 42 with the optical semiconductor device 43 mounted thereon and the optical waveguide substrate 41 are finally arranged by image-recognition positioning, resulting in completion of an optical module as shown in FIG. 4.

As for the groove 111 for optical waveguide, it is preferably formed by molding, as described for the present Embodiment, from the manufacturing point of view, but its formation method is not limited to molding, and it may be formed by etching according to need. In the present Embodiment, the groove 111 for optical waveguide is filled with a ultraviolet curing resin, but the filling material is not limited to it, and such resins as polyamide and the like may be used. As for the clad layer, it may be formed by spin coating, and it may also be formed by using another ultraviolet curing resin, with which clad layer the optical waveguide substrate and the high-frequency circuit substrate may be joined fixedly.

In the present Embodiment, the optical waveguide substrate is fabricated by forming the groove, but the fabrication procedure thereof is not limited to this, and the optical waveguide may be constructed by depositing the core and clad onto the substrate surface.

Although as for the present Embodiment, one straight-line type waveguide is illustrated, the present Embodiment is not restricted to this type, but it is also applicable to all the waveguide patterns generally used, and in particular it can control the bending, branching, and integrating of the lightwaves.

Although as for the present Embodiment, description is made on a case where an optical semiconductor device is mounted, the number of the optical semiconductors mounted is not limited to one, and a plurality of optical semiconductors maybe mounted, and furthermore, a laser diode, a optical semiconductors may be mounted, and furthermore, a laser diode, a photodiode, and the like may be included to be used in combination thereof.

Although as for the present Embodiment, description is made on a high-frequency circuit substrate where a microstrip line is arranged, the line is not restricted to this type, but a coplanar line may be used.

As described above, according to the present Embodiment, optical modules mainly used in optical communication can be easily mass-produced at low costs.

(Embodiment 5)

Now, description will be made on Embodiment 5 of the present invention for an optical module and a manufacturing method thereof.

In Embodiments 1 to 4, the surface of the core formed in the groove 111 for optical waveguide is not protected, but exposed to the air. Accordingly, there may possibly occur such a problem that the core formed in the groove 111 for optical waveguide is soiled by dust and thereby damaged. In Embodiment 5, such a problem will be solved.

Figure 6:
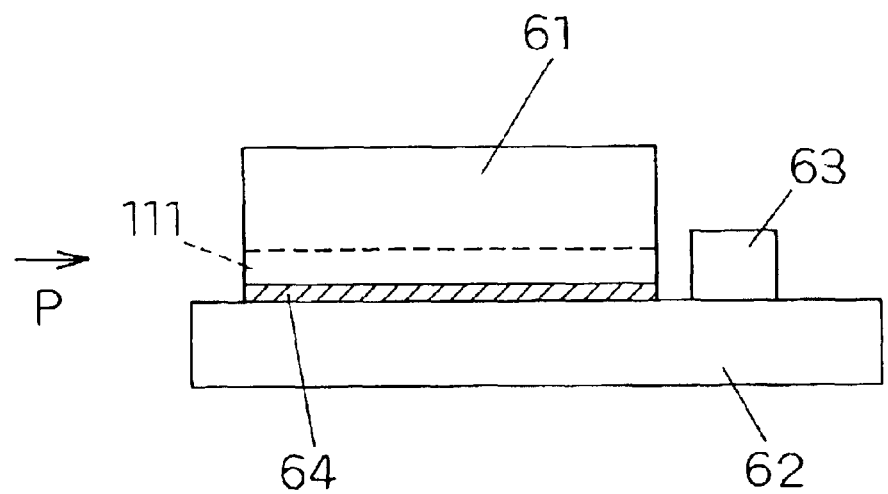
FIG. 6 shows (a) an optical module of Embodiment 5 of the present invention, and (b) a view thereof from the point P.
Figure 6:
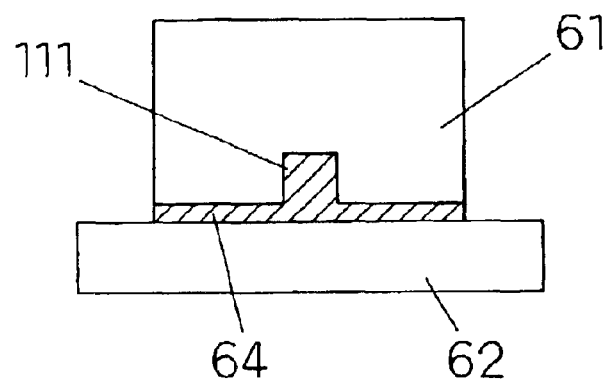

FIG. 6 shows (a) a side view of an optical module of Embodiment 5, and (b) a view thereof from the point P.

At the beginning, as FIG. 6 shows, and a groove 111 for optical waveguide and a marker (not shown) for positioning to a high-frequency circuit substrate 62 are formed by use of a mold (not shown) on the surface of a substrate 61, having a groove for optical waveguide core, made of a glass or a transparent resin.

Then, an ultraviolet curing resin is applied as a material 64 of high refractive index onto the surface of the substrate 61 having a groove for optical waveguide core, on which surface the groove 111 for optical waveguide is formed, and the groove 111 for optical waveguide is filled with the same resin.

Subsequently, the substrate 61 having the groove for optical waveguide core is bonded to a high-frequency circuit substrate 62, by interposing a spacer (not shown) formed on the substrate 62.

Then, the material 64 of high refractive index on the surface where the groove 111 for optical waveguide formed, and that in the groove 111 for optical waveguide are cured by ultraviolet light irradiation. By using a material higher in refractive index than the substrate, as the material 64 of high refractive index, the material 64 in the groove 111 for optical waveguide functions as a core for the optical waveguide. Thus, the formation of a waveguide substrate 61 is completed.

In Embodiment 5, in contrast to Embodiments 1 to 4, the space left between the substrate 61 having the groove for optical waveguide core and the high-frequency circuit substrate 62 is filled with an ultraviolet curing resin, as the material 64 of high refractive index, and hence the core formed in the groove for optical waveguide is not directly exposed to the air. In this way, the core surface formed in the groove 111 for optical waveguide can now be protected.

Then, an optical semiconductor device 63 is mounted on the surface of the high-frequency circuit substrate 62, and here is omitted a relevant explanation, since the procedures for mounting and the like are similar to those in Embodiments 1 to 4.

Now, the optical waveguide substrate 61 is arranged on the high-frequency circuit substrate 62 with the optical semiconductor device 63 mounted thereon, through positioning based on the markers and adjusting the height of the substrate 61 with an interposing spacer, thus completing the formation of an optical module as shown in FIG. 6.

Needless to say, all the variations described for Embodiments 1 to 4 are also applicable to Embodiment 5.

(Embodiment 6)

Now, description will be made on Embodiment 6 of the present invention for an optical module and a manufacturing method thereof.

In Embodiments 1 to 4, the surface of the core formed in the groove 111 for optical waveguide is not protected, but directly exposed to the air. Accordingly, there may possibly occur such a problem that the core formed in the groove 111 for optical waveguide is soiled by dust and thereby damaged, and such another problem that the light beam distribution becomes asymmetric due to the asymmetry in refractive index around the groove 111 for optical waveguide. In Embodiment 6, these problems will be solved.

Figure 7:
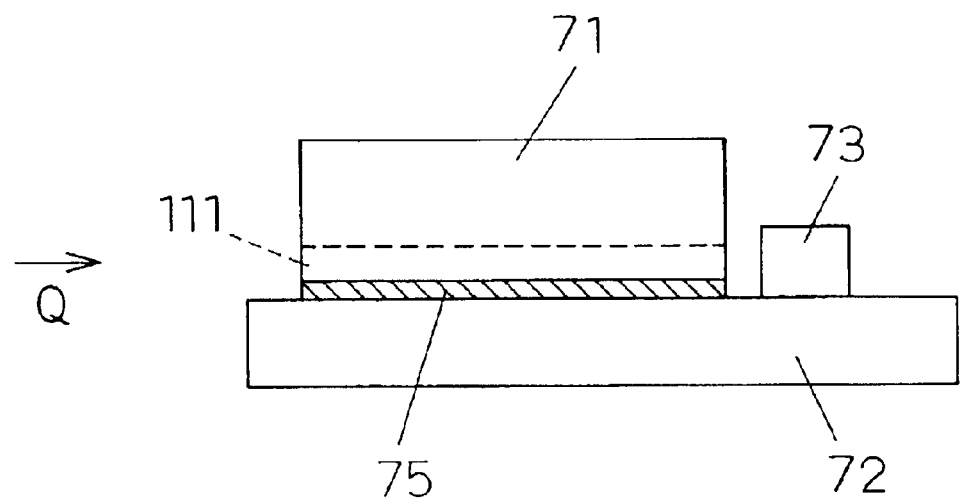
FIG. 7 shows (a) an optical module of Embodiment 6 of the present invention, and (b) a view thereof from the point Q.
Figure 7:
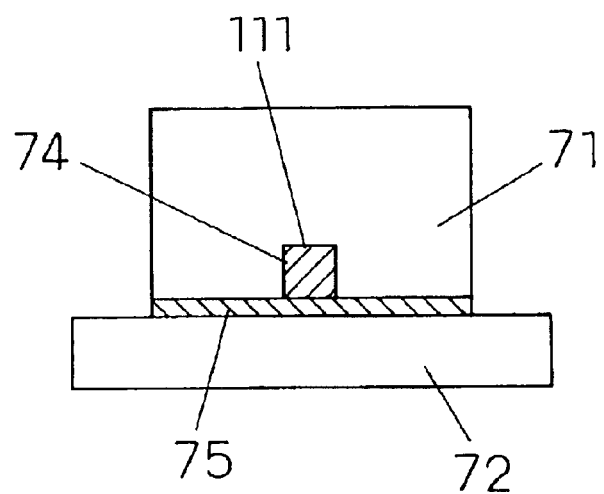

FIG. 7 shows (a) a side view of an optical module of Embodiment 6, and (b) a view thereof from the point Q.

At the beginning, as FIG. 7 shows, a groove 111 for optical waveguide and a marker (not shown) for positioning to a high-frequency circuit substrate 72 are formed by use of a mold (not shown) on the surface of a substrate 71, having a groove for optical waveguide core, made of a glass or a transparent resin.

Then, an ultraviolet curing resin is applied as a material of high refractive index, in a manner as indicated in FIG. 7(a) by a material 74 of high refractive index, onto the surface where the groove 111 for optical waveguide is formed, and the groove 111 for optical waveguide is filled with the same resin. Subsequently, the material of high refractive index 74 in the groove 111 for optical waveguide is cured by the ultraviolet irradiation.

Then, the surface of the substrate 71 having a groove for optical waveguide core, on which surface the groove 111 for optical waveguide is formed, is ground for the purpose of removing the material 74 of high refractive index from the coated portions other than the groove 111 for optical waveguide.

Then, an ultraviolet curing resin of low refractive index is applied, in a manner as indicated in FIG. 7(b) by a material 75 of low refractive index, onto the surface of the substrate 71 having a groove for optical waveguide core, on which surface the groove 111 for optical waveguide is formed, and the substrate 71 is bonded to a high-frequency circuit substrate 72, by interposing a spacer formed the substrate 72.

Subsequently, the material 75 of low refractive index applied onto the surface, where the groove 111 for optical waveguide being formed, is cured by the ultraviolet irradiation.

The ultraviolet curing resin in the groove 111 for optical waveguide functions as a core for the optical waveguide, by filling the groove 111 for optical waveguide with the material 74 of high refractive index, and by applying the material 75 of low refractive index on the surface where the groove 111 for optical waveguide is formed. In particular, when the refractive indexes of the material 75 of low refractive index and the substrate 71 having the groove for optical waveguide core are practically the same, the distribution of the light beam in the core of the optical waveguide can be made to be symmetric. Thus, the formation of the optical waveguide substrate 71 is completed.

In Embodiment 6, in contrast to Embodiments 1 to 4, the space left between the substrate 71 having the groove for optical waveguide core and the high-frequency circuit substrate 72 is filled with the material 75 of low refractive index, and hence the core formed in the groove 111 for optical waveguide is not directly exposed to the air. In this way, the core surface formed in the groove 111 for optical waveguide can now be protected.

Now, an optical semiconductor device 73 is mounted on the surface of the high-frequency circuit substrate 72, and here is omitted a relevant explanation, since the procedures for mounting and the like are similar to those in Embodiment 1.

The optical waveguide substrate 71 is arranged on the high-frequency circuit substrate 72 with the optical semiconductor device 73 mounted thereon, through positioning based on the markers and adjusting the height of the substrate 71 with an interposing spacer, thus completing the formation of an optical module as shown in FIG. 7.

As described above, in Embodiment 6, by using the material 75 of low refractive index, the distribution of the light beam in the core formed in the groove 111 for optical waveguide can be made symmetric, and the leakage of the light beam propagating in the groove 111 for optical waveguide can be prevented.

Needless to say, all the variations and modifications described for Embodiments 1 to 4 are also applicable to Embodiment 6.

(Embodiment 7)

Now, description will be made on Embodiment 7 of the present invention for an optical module and a manufacturing method thereof.

In Embodiments 1 to 4, the surface of the core formed in the groove 111 for optical waveguide is not protected, but directly exposed to the air. Accordingly, there may possibly occur such a problem that the core formed in the groove 111 for optical waveguide is soiled by dust and thereby damaged, and such another problem that the light beam distribution becomes asymmetric due to the asymmetry in refractive index around the groove 111 for optical waveguide. In Embodiment 7, these problems will be solved.

Figure 8:
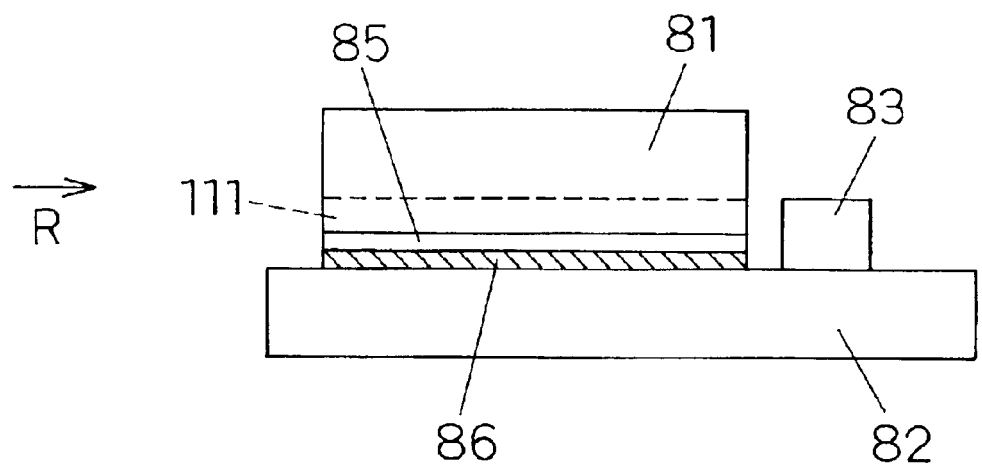
FIG. 8 shows (a) an optical module of Embodiment 7 of the present invention, and (b) a view thereof from the point R.
Figure 8:
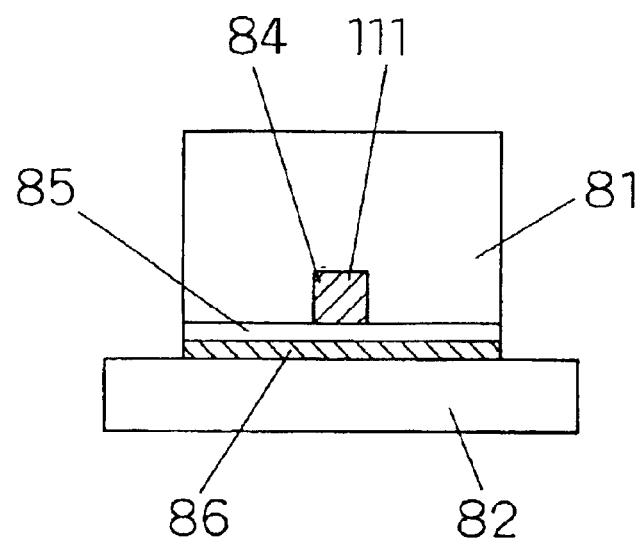

FIG. 8 shows (a) a side view of an optical module of Embodiment 7, and (b) a view thereof from the point R.

At the beginning, as FIG. 8 shows, and a groove 111 for optical waveguide and a marker (not shown) for positioning to a high-frequency circuit substrate 82 are formed by use of a mold (not shown) on the surface of a substrate 81, having a groove for optical waveguide core, made of a glass or a transparent resin.

Then, an ultraviolet curing resin having a high refractive index is applied as a material of high refractive index, which is indicated in FIG. 8 by a material 84 of high refractive index, onto the surface where the groove 111 for optical waveguide is formed, and the groove 111 for optical waveguide is filled with the same resin. Subsequently, the ultraviolet curing resin in the groove 111 for optical waveguide is cured by the ultraviolet irradiation.

Then, the surface of the substrate 81 having a groove for optical waveguide core, on which surface the groove 111 for optical waveguide is formed, is ground for the purpose of removing the material 84 of high refractive index from the coated portions other than the groove 111 for optical waveguide.

Then, a clad substrate 85 is bonded to the surface of the substrate 81 having a groove for optical waveguide core, on which surface the groove 111 for the optical wavegudie is formed. Thus, the substrate for the optical waveguide composed of the substrate 81 having the groove for the optical waveguide core and the clad substrate 85 is completely formed.

Then, a resin material 86 is applied onto the surface of the clad substrate 85, which surface not facing to the groove 111 for optical waveguide, and is bonded to the high-frequency circuit substrate 82, by interposing a spacer formed on the substrate 82.

By filling the groove 111 for optical waveguide with the material 84 of high refractive index, and by bonding the clad substrate 85 to the surface of substrate 81 on which surface the groove 111 for optical waveguide is formed, the optical waveguide substrate can be firstly finished, and the material 84 of high refractive index in the groove 111 for optical waveguide functions as the core of the optical waveguide.

In particular, when the refractive indexes of the clad substrate 85 and the substrate 81 having the groove for optical waveguide core are practically the same, the distribution of the light beam in the optical waveguide core can be made symmetric.

In Embodiment 7, the clad substrate 85 is bonded to the surface of the substrate 81 having the groove for optical waveguide core, on which surface the groove 111 for optical waveguide is formed, and hence the optical waveguide surface can be protected. By bonding the clad substrate 85, the leakage of the light propagating in the material 84 of high refractive index in the groove 111 for optical waveguide can be prevented.

Now, an optical semiconductor device 83 is mounted on the surface of the high-frequency circuit substrate 82, and here is omitted a relevant explanation, since the procedures for mounting and the like are similar to those in Embodiment 1.

The optical waveguide substrate 81 is arranged on the high-frequency circuit substrate 82 with the optical semiconductor device 83 mounted thereon, through positioning based on the markers and adjusting the height of the substrate 81 with an interposing spacer, thus completing the formation of an optical module as shown in FIG. 8.

As described above, in Embodiment 7, by using the clad substrate 85, the optical waveguide substrate can be firstly finished, and the distribution of the light beam in the core formed in the groove 111 for optical waveguide can be made symmetric, and furthermore, the leakage of the light propagating in the groove 111 for optical waveguide can be prevented.

Needless to say, all the variations and modifications described for Embodiments 1 to 4 are also applicable to Embodiment 7.

The present invention includes a communication apparatus which performs via optical fiber the optical communication with other communication apparatuses; comprises a transmitting device converting the incoming electric signals to the optical signals and transmitting them, and a receiving device converting the optical signals transmitted by the other communication apparatuses to the electric signals and outputting them; and in which the transmitting device and/or receiving device uses an optical module of the present invention.

As can be seen from the above, the present invention can provide an optical module which is simultaneously excellent in performance and low in cost, a manufacturing method thereof, and a communication apparatus incorporating the optical module.

What is claimed is:

1. An optical module comprising:
   a high-frequency circuit substrate;
   at least one optical semiconductor device mounted on said high-frequency circuit substrate; and
   an optical waveguide substrate arranged on said high-frequency circuit substrate, said optical waveguide substrate has a first substrate cladding having a groove for optical waveguide, said groove for optical waveguide is filled with a material of high refractive index to form a core, and said groove is covered with a resin that forms a second substrate cladding;
   wherein said optical waveguide substrate is formed by bonding said first substrate and said second substrate with a material of high refractive index having a refractive index higher than those of said first substrate and said second substrate; and
   wherein the side surface of said second substrate, which surface is reverse to the side surface bonded to said first substrate, is bonded to said high-frequency circuit substrate with a resin material.

2. The optical module according to claim 1 wherein said second substrate cladding is a material of high refractive index.

3. The optical module according to claim 1 wherein said second substrate cladding is a material of low refractive index having a refractive index lower than that of said material of high refractive index.

4. The optical module according to claim 1 wherein said optical waveguide substrate and said high-frequency circuit substrate have markers for positioning.

5. The optical module according to claim 1 wherein said material of high refractive index is a glass-based material or a resin.

6. The optical module according to claim 1 wherein a glass-based material or a resin is used for said optical waveguide substrate.

7. The optical module according to claim 1 wherein said high-frequency circuit substrate is a microstrip line substrate or a coplanar line substrate.

8. The optical module according to claim 1 wherein said high-frequency circuit substrate and said optical waveguide substrate are arranged with a resin matter interposing therebetween.

9. The optical module according to claim 8 in which said high-frequency circuit substrate is composed of a substrate having a groove for optical waveguide and a material higher in refractive index than said substrate having a groove for optical waveguide, wherein:

said groove for optical waveguide is filled with said material of high refractive index.

10. The optical module according to claim 1 wherein said high-frequency circuit substrate is arranged on a metallic base.

11. The optical module according to claim 10 wherein an arrangement groove for optical fiber is formed on said metallic base.

12. A communication apparatus with which optical communication is performed via an optical fiber with another communication apparatus, comprising:

a transmission device in which an incoming electric signal is converted into an optical signal to be transmitted; and a receiving device in which an optical signal transmitted by said another communication apparatus is converted into an electric signal to be output; wherein the optical module according to claim 1 is used for said transmission device and/or said receiving device.

13. The optical module of claim 1, wherein said resin that forms the second substrate cladding bonds to the first substrate cladding and bonds said optical waveguide substrate to said high-frequency circuit substrate.

14. An optical module comprising:

a high-frequency circuit substrate;

at least one optical semiconductor device mounted on said high-frequency circuit substrate; and an optical waveguide substrate arranged on said high-frequency circuit substrate, said optical waveguide substrate has a first substrate cladding having a groove for optical waveguide, said groove for optical waveguide is filled with a material of high refractive index to form a core, and said groove is covered with a resin that forms a second substrate cladding;

wherein said high frequency circuit substrate has on one of its end faces an arrangement groove for optical fiber or an optical element; and wherein the relief shapes of said groove for optical waveguide, said marker for positioning, and said arrangement groove for optical fiber are formed en bloc by use of a mold having a patterned indented surface.

15. The optical module according to claim 14 wherein said optical waveguide substrate has an arrangement groove for said optical fiber or said optical element.

\* \* \* \* \*